Figure 1:
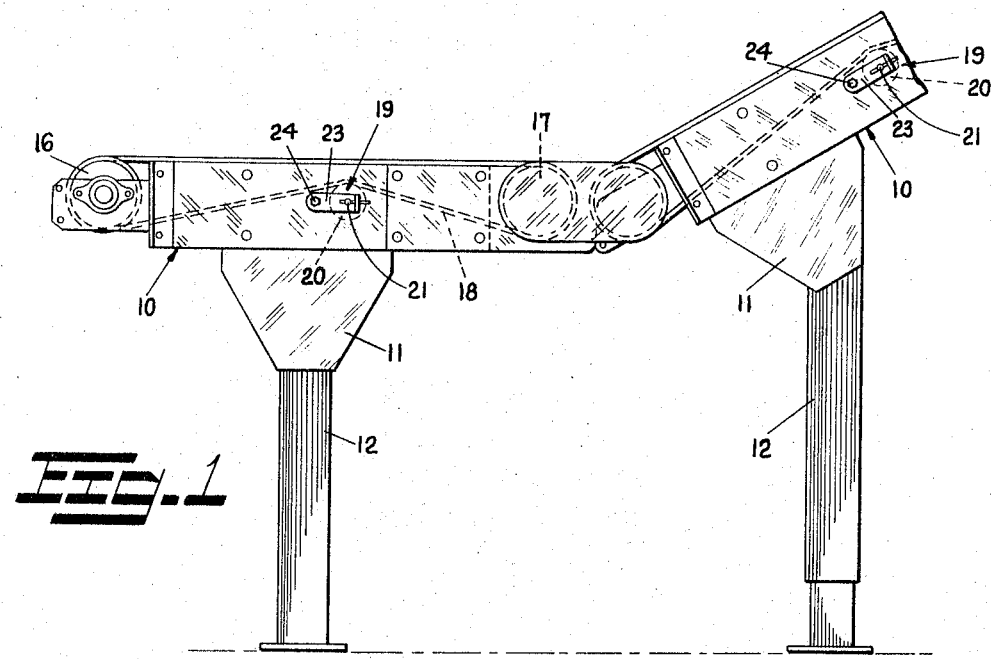

March 7, 1967    G. B. STONE    3,307,682
CONVEYOR BELT ADJUSTING MECHANISM
Filed Sept. 13, 1965

INVENTOR.
GUTHRIE B. STONE.
BY
Albert A. Mahannel
ATTORNEY

March 7, 1967 G. B. STONE 3,307,682
CONVEYOR BELT ADJUSTING MECHANISM
Filed Sept. 13, 1965
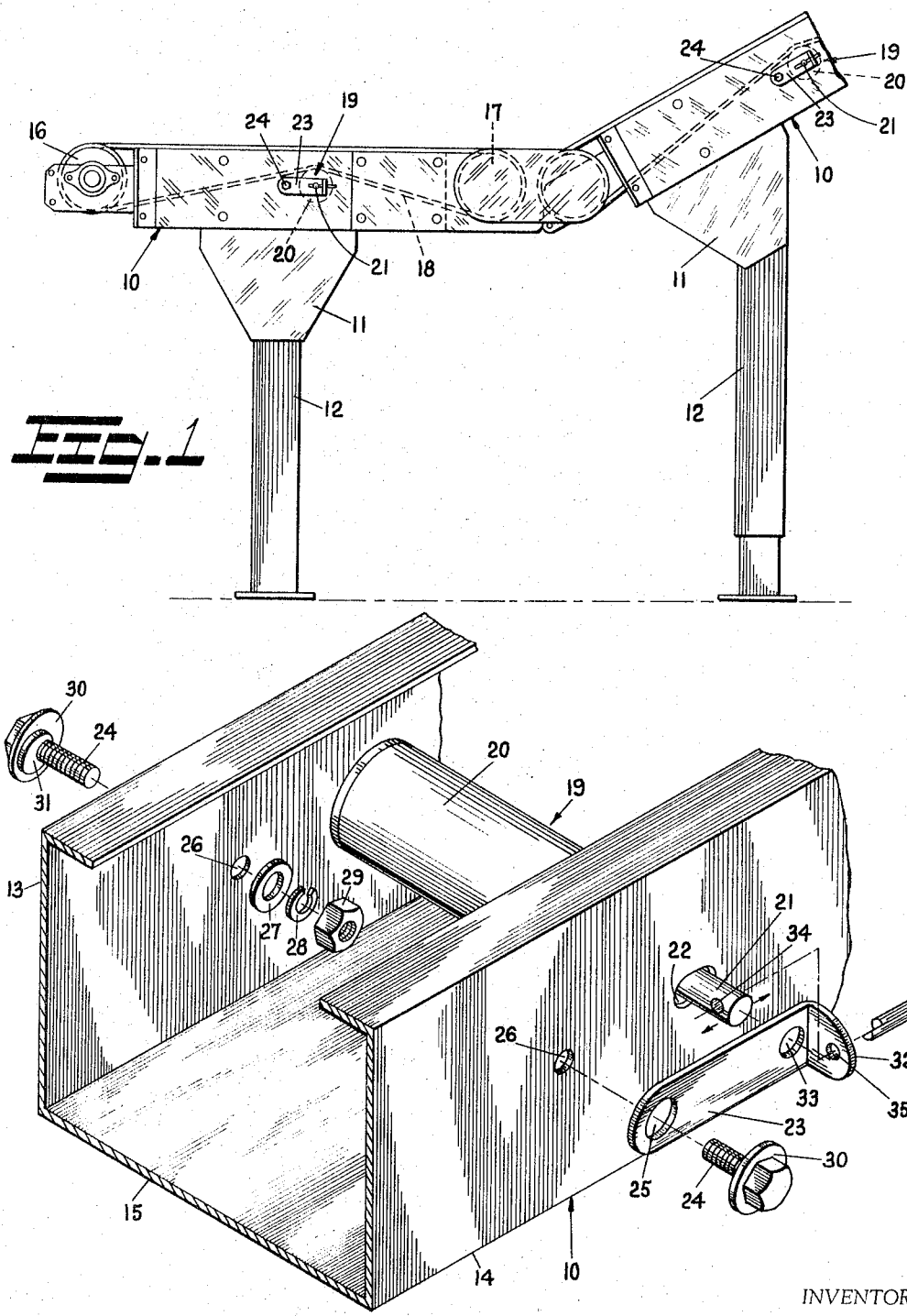
INVENTOR.
GUTHRIE B. STONE.
BY
Albert A. Mahannel
ATTORNEY

United States Patent Office 3,307,682
Patented Mar. 7, 1967

3,307,682
CONVEYOR BELT ADJUSTING MECHANISM
Guthrie B. Stone, Honeoye, N.Y., assignor to Stone Conveyor Company, Inc., Honeoye, N.Y.
Filed Sept. 13, 1965, Ser. No. 486,740
3 Claims. (Cl. 198—202)

This invention pertains to belt conveyors and, more particularly, to an improved means for guiding and controlling the conveying belt thereof.

It is a general object of the invention to provide the freely rotatable guiding rollers of belt conveyors with a selectively adjustable positioning means.

It is a further object of the invention to provide the supporting shafts of the freely rotatable rollers with a locking means to prevent their rotation with said rollers.

A further object of the invention is to provide a selectively adjustable roller positioning means whereby upon reversing the direction the conveyor belt is adapted to move, said rollers may be repositioned to permit said belt to travel smoothly in the reverse direction.

A further and more specific object is that of providing a roller adjustment means which upon reversing the direction of the conveyor belt travel, the rollers can be adjusted to an exact 90° relationship to the direction of belt travel whereby said belt will be caused to travel in a generally centralized position across said rollers.

Further objects and advantages of the invention will become apparent from the following more detailed disclosure.

As is well known to those conversant with the conveyor art, belt type conveyors normally move in one direction while performing their intended function and are usually provided with a plurality of freely rotatable roller elements for guiding the belt during its movement. The position of these freely rotatable guide rollers is of importance to assure that the belt moves freely and with a minimum amount of resistance.

On certain conveyor installations it is sometimes desirable to reverse the direction of the conveyor belt and when the guide rollers are in a fixed position for guiding and supporting the belt for movement in one direction the reversing of the belt's direction of movement will not permit it to move as freely or with the minimum resistance it has when moving in its intended direction.

The selectively adjustable roller positioning means according to the instant invention provides longitudinal adjustment of the freely rotatable roller elements relative to the bed member in which they are journaled and if it is desired to reverse the direction of the belt, the rollers can be adjusted to compensate for this change in direction.

The roller members are supported for rotary movement on shaft members which extend through the rollers and the ends thereof assemble in aligned slots provided in the side walls of the conveyor bed.

These slots permit the shafts and rollers thereon to be moved within the limits of said slots and an anchoring means permits the shafts to be set at any desired point within these limits.

Additionally the invention provides a locking arrangement whereby these shafts are not permitted to rotate with the roller members which they support.

Figure 2:
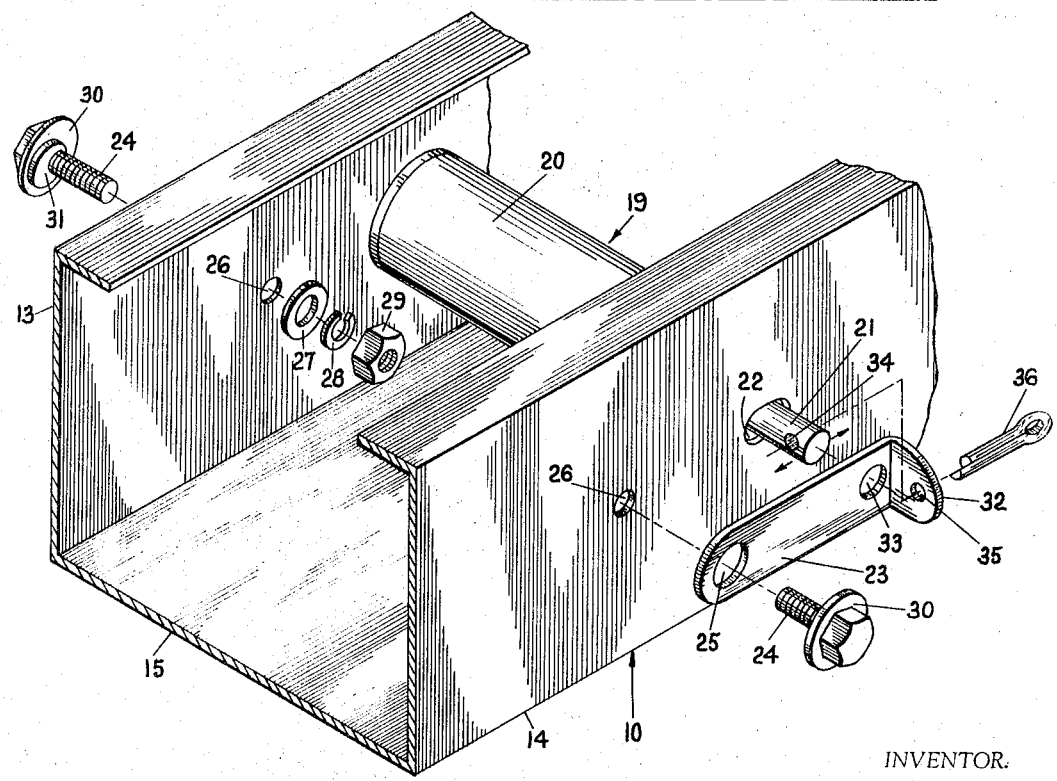

The invention will hereinafter be described in greater detail by reference to a specific embodiment thereof as illustrated in the accompanying figures of drawings, wherein:

FIG. 1 is a view in side elevation of a portion of a belt conveyor showing the adjustable roller members according to the invention applied thereto, and FIG. 2 is a perspective view of a portion of a conveyor bed as seen looking from the underside thereof showing in exploded form the various components for adjusting the roller member and the locking arrangement to prevent said roller's supporting shaft from rotating.

Now referring the the figures of drawing, enough of a belt type conveyor is shown in FIGS. 1 and 2 to serve as a basis for a detailed description of the invention applied thereto.

The view in side elevation of a portion of a belt conveyor as illustrated in FIG. 1 incldes a pair of contiguously disposed bed members that are indicated generally by numeral 10. These bed members are supported in spaced relation to the floor by means of support brackets 11 from which depend adjustable leg members 12.

The perspective view of the bed member 10 as illustrated in FIG. 2 shows the configuration of said bed which is generally U-shaped and includes opposed and vertically disposed side walls 13 and 14 which are interconnected by a lower planar surface 15.

FIG. 1 shows the usual drive and idler rollers 16 and 17 which in a known manner are utilized to drive and guide a conveyor belt 18.

The belt conveyor adjusting mechanism according to the instant invention is depicted generally in FIG. 1 by numeral 19. In FIG. 2 this mechanism is shown in further detail and includes a roller member 20 which is assembled for rotary movement on a through shaft 21. The ends of this shaft extend beyond each end of the roller 20 and are adapted to be received into aligned and horizontally disposed slots 22 provided in the opposed side walls 13 and 14 of the bed member 10 (one only shown in FIG. 2). It can now be easily seen that the roller 20 on shaft 21 is movable within the limits of the slots 22 and that the roller serves to guide the belt 18 during its movement across the outer surface thereof.

The means by which the roller 20 is selectively positioned at any desired point within the limits of the slots 22 will now be described.

A pair of generally L-shaped roller adjustment clips 23 (one only shown in FIG. 2) are attached to the outer planar surface of the side walls 13 and 14 by means of bolts 24. The threaded portions of these bolts pass through enlarged holes 25 in one end of the adjustment clips 23 and thence through aligned holes 26 in side walls 13 and 14 which are spaced from and in horizontal alignment with slots 22.

The threaded portion of these bolts which extend within the confines of the bed member 10 are adapted to receive washers 27 and 28 and a nut 29 which when tightened fixedly position the adjustment clips in mating relation with the side walls 13 and 14. The heads of bolts 24 are preferably of hexagonal shape and include integrally therewith enlarged washer-like discs 30 which are adapted to overlie the enlarged holes 25 of the adjustment clips 23 when said bolts are in assembled position.

Those sides of the washer-like discs 30 opposite the head of the bolts 24 are provided with cam washers 31 (one only shown in FIG. 2) which are eccentrically formed and after being assembled over the threaded portion of bolts 24 they are fixedly attached to said discs 30 by any suitable means such as by silver brazing. In assembled position these cam washers fit into the enlarged holes 25 provided in one end of the adjustment clips 23 and by loosening the bolts and turning the same in one direction or the other, the eccentric camming motion causes the opposite ends of said clips to move in a horizontal plane relative to the bed member 10. Those ends of the adjustment clips 23 opposite the enlarged holes 25 are provided with integrally formed and outwardly directed ear-like projections 32 and are utilized in preventing the roller supporting shaft 21 from rotating in a manner to be described.

These adjustment clips are also provided with a hole 33 (FIG. 2) which is disposed in spaced relation to the enlarged hole 25 and immediately adjacent to the ear-like projection 32.

In assembled position, the ends of shaft 21 pass through and beyond these holes 33 to extend in parallel relation with the projections 32.

The shaft 21, adjacent its ends, is provided with laterally extending holes 34 (one only shown in FIG. 2) which are in alignment with cooperating holes 35 in the ear-like projections 32 of the adjustment clips 23. A cotter pin 36 is adapted to extend through holes 34 and 35 thereby forming a locking arrangement which prevents shaft 21 from rotating with roller 20.

In operation, the conveyor belt 18 is driven and caused to travel in a conventional and known manner. The roller members 20 as shown in FIG. 1 serve to guide the conveyor belt during its movement and they are positioned so as to permit said belt to move freely and with a minimum amount of resistance in a given direction. If it is desired to run the conveyor belt in reverse of its intended direction of travel the roller members 20 are easily adjustable so as to provide a minimum amount of resistance as the belt moves in the opposite direction. This means of adjustment as heretofore described is accomplished by simply loosening bolts 24 and turning the head portions thereof in one direction or the other. During this movement the cam washers 31 create an eccentric motion that is effective in moving shaft 21 and the roller 20 supported thereby within the limits of the slots 22 provided in the side walls 13 and 14 of the bed member 10. When the appropriate position of the roller is obtained, bolts 24 are simply tightened to maintain this position. Additionally the advantage of maintaining shaft 21 from rotating with the roller 20 prevents undesirable wear from developing on the shaft and within the slots 22 of the bed member 10.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. In a belt conveyor adapted to move articles therealong having a supporting bed with a plurality of supporting rollers journaled in said bed and across which a conveyor belt is adapted to travel, the improvement comprising freely rotatable rollers mounted at predetermined points within said bed, shaft members for supporting said rollers, shaft locking means to prevent rotation of said shaft members with said rollers, and a further means for longitudinal adjustment of said rollers relative to said bed which includes adjustment clips eccentrically attached to each side of said bed and being selectively movable relative to the latter to move said shaft members within aligned slots provided in said bed.

2. The mechanism according to claim 1 wherein a fastening means is provided for fixedly positioning said adjustment clips to each side of said bed.

3. The mechanism according to claim 1 wherein said adjustment clips are adapted to have the ends of said shaft members attached thereto to prevent rotation thereof with said freely rotatable rollers.

References Cited by the Examiner
UNITED STATES PATENTS
3,035,683  5/1962  Bishop _____ 198—127

EVON C. BLUNK, *Primary Examiner.*
RICHARD E. AEGERTER, *Examiner.*